(12) United States Patent
Park et al.

(10) Patent No.: US 8,989,079 B2
(45) Date of Patent: Mar. 24, 2015

(54) APPARATUS FOR TRANSMITTING AND RECEIVING UPLINK BACKHAUL SIGNAL IN WIRELESS COMMUNICATION SYSTEM AND METHOD THEREOF

(75) Inventors: Kyu Jin Park, Anyang-si (KR); Sung Ho Moon, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 459 days.

(21) Appl. No.: 13/501,091

(22) PCT Filed: Oct. 11, 2010

(86) PCT No.: PCT/KR2010/006944
§ 371 (c)(1),
(2), (4) Date: Jun. 29, 2012

(87) PCT Pub. No.: WO2011/043636
PCT Pub. Date: Apr. 14, 2011

(65) Prior Publication Data
US 2012/0269113 A1    Oct. 25, 2012

Related U.S. Application Data

(60) Provisional application No. 61/250,005, filed on Oct. 9, 2009.

(30) Foreign Application Priority Data

Oct. 11, 2010 (KR) .................... 10-2010-0098790

(51) Int. Cl.
  *H04B 7/14* (2006.01)
  *H04B 7/26* (2006.01)
  *H04J 11/00* (2006.01)
  *H04W 56/00* (2009.01)

(52) U.S. Cl.
  CPC ........... *H04B 7/2656* (2013.01); *H04J 11/0069* (2013.01); *H04W 56/00* (2013.01)
  USPC ........................................................ 370/315

(58) Field of Classification Search
  None
  See application file for complete search history.

(56) References Cited

U.S. PATENT DOCUMENTS

| 2009/0075588 A1* | 3/2009 | Zhu et al. .................. 455/18 |
| 2010/0214972 A1* | 8/2010 | Che et al. .................. 370/315 |
| 2011/0170475 A1* | 7/2011 | Raaf .......................... 370/315 |

FOREIGN PATENT DOCUMENTS

KR          1020070050836          5/2007

OTHER PUBLICATIONS

ZTE, "Consideration on UL Backhaul Resource Configuration and Indication", R1-092469, TSG-RAN WG1 #57bis, Jun. 2009.
ETRI, "Considerations on guard period in backhaul uplink subframe", R1-092300, 3GPP TSG RAN WG1 Meeting #57bis, Jun. 2009.
Samsung, "Guard period in UL backhaul subframes and DL/UL timing design", R1-092661, 3GPP TSG RAN WG1 #57bis, Jun. 2009.

* cited by examiner

*Primary Examiner* — Chirag Shah
*Assistant Examiner* — Rina Pancholi
(74) *Attorney, Agent, or Firm* — Lee, Hong, Degerman, Kang & Waimey

(57) ABSTRACT

Disclosed are an apparatus for transmitting and receiving an uplink backhaul signal in a wireless communication system and a method thereof. The method for receiving the uplink backhaul signal from a relay station in a base station, comprises the step of receiving a signal transmitted through an uplink backhaul sub-frame of an index N in the relay station using an uplink sub-frame of an index N or an index N+1 in the base station. The base station receives the signal transmitted from the relay station in the uplink sub-frame of the index N or the index N+1 of the base station at the delayed timing corresponding to a propagation delay value of the signal according to the distance between the relay station and the base station from a transmitting time point.

10 Claims, 14 Drawing Sheets

(a)

(b)

APPARATUS FOR TRANSMITTING AND RECEIVING UPLINK BACKHAUL SIGNAL IN WIRELESS COMMUNICATION SYSTEM AND METHOD THEREOF

CROSS-REFERENCE TO RELATED APPLICATIONS

This application is the National Stage filing under 35 U.S.C. 371 of International Application No. PCT/KR2010/006944, filed on Oct. 11, 2010, which claims the benefit of earlier filing date and right of priority to Korean Application No. 10-2010-0098790, filed on Oct. 11, 2010, and also claims the benefit of U.S. Provisional Application Ser. No. 61/250,005, filed on Oct. 9, 2009, the contents of which are all incorporated by reference herein in their entirety.

TECHNICAL FIELD

The present invention relates to a wireless communication, and more particularly, to an apparatus for transmitting and receiving an uplink backhaul signal in a wireless communication system.

BACKGROUND ART

In case that a channel status between a base station (or an eNode B) and a terminal (or a user equipment), a relay node (RN) is installed between the eNode B and the user equipment, thereby providing the user equipment with a radio channel having a better channel status. Moreover, by introducing a relay node into a cell edge area having a poor channel status from an eNode B, if the relay node is used, it may provide a faster data channel and extend a cell service area. Thus, a relay node is the technology introduced to solve a radio wave shadow area problem and is widely used.

Compared to a conventional relay node having a function limited to a function of a repeater configured to simply amplify and transmit a signal, a recent relay node is evolved into a further-intellectual form. Moreover, the relay node technology corresponds to the technology essential to service coverage extension and data throughput improvement as well as cost reductions for base station expansion and backhaul network maintenance in a next generation mobile communication system. To keep up with the ongoing development of the relay node technology, it is necessary for a new wireless communication system to support a relay node used by the related art wireless communication system.

As a role of forwarding a link connection between an eNode B and a user equipment is introduced into a relay node in LTE-A system, two types of links differing from each other in attribute are applied to UL carrier frequency band and DL carrier frequency band, respectively. A link part connected between an eNode B and a relay node is represented in a manner of being defined as a backhaul link. If transmission is performed by FDD (frequency division duplex) or TDD (time division duplex) using DL resource, it may be called a backhaul downlink. If transmission is performed by FDD (frequency division duplex) or TDD (time division duplex) using UL resource, it may be called a backhaul uplink.

Thus, in 3GPP LTE-A system, a relay node is defined to transmit a signal to an eNode B via an uplink backhaul subframe and is also defined to receive a signal from the eNode B via a downlink backhaul subframe. However, any structure of an uplink backhaul subframe between a relay node and an eNode B has not been proposed in detail yet.

DISCLOSURE OF THE INVENTION

Technical Tasks

One object of the present invention is to provide a method for an eNode B to receive an uplink (UL) backhaul signal from a relay node.

Another object of the present invention is to provide a method for an eNode B to transmit a UL backhaul signal to a relay node.

Another object of the present invention is to provide an eNode B apparatus for receiving a UL backhaul signal from a relay node.

A further object of the present invention is to provide a relay node apparatus for transmitting a UL backhaul signal to an eNode B.

Technical tasks obtainable from the present invention may be non-limited by the above mentioned technical tasks. And, other unmentioned technical tasks can be clearly understood from the following description by those having ordinary skill in the technical field to which the present invention pertains.

Technical Solutions

To achieve these and other advantages and in accordance with the purpose of the present invention, as embodied and broadly described, a method of receiving a UL backhaul signal at an eNode B from a relay node (RN) in a wireless communication system, according to one embodiment of the present invention includes the step of receiving a signal transmitted from the relay node via a UL backhaul subframe of an index N of the relay node through a UL subframe of the index N or an index N+1 of the eNode B, wherein the eNode B receives the signal from the relay node at a timing delayed by a propagation delay time value of the signal due to a distance (or geometry) between the relay node and the eNode B from a transmitted timing point of the signal in the UL subframe of the index N or the index N+1 of the eNode B.

Preferably, the eNode B receives the signal from the relay node by any one reception mode of first reception mode of receiving the signal via sixth to fourteenth symbols of the UL backhaul subframe of the index N of the eNode B, a second reception mode of receiving the signal via a second slot of the UL backhaul subframe of the index N of the eNode B, a third reception mode of receiving the signal via first to eighth symbols of a UL backhaul subframe of the index N+1 of the eNode B, and a fourth reception mode of receiving the signal transmitted by the relay node via a first slot of a UL subframe of the index N+1 of the eNode B according to the delayed timing.

To further achieve these and other advantages and in accordance with the purpose of the present invention, a method of transmitting a UL backhaul signal from a relay node to an eNode B in a wireless communication system, according to another embodiment of the present invention includes the step of transmitting the UL backhaul signal via a UL backhaul subframe of an index N of the relay node, wherein the relay node transmits the UL backhaul signal in the UL backhaul subframe of the index N via 9 symbols subsequent to a first guard period corresponding to a time necessary for the relay node to switch from a reception mode to a transmission mode, 8 symbols preceding a second guard period corresponding to a time necessary for a switching from the transmission mode to the reception mode, or 7 symbols located between idle intervals.

Preferably, the UL backhaul signal transmitted from the relay node is received by the eNode B at a timing delayed by a propagation delay time value of the UL backhaul signal in accordance with a distance between the relay node and the eNode B.

To further achieve these and other advantages and in accordance with the purpose of the present invention, an eNode B for receiving a UL backhaul signal from a relay node in a wireless communication system, according to another embodiment of the present invention, eNode B includes a receiver configured to receive a signal transmitted from the relay node via a UL backhaul subframe of an index N of the relay node through a UL subframe of the index N or an index N+1 of the eNode B and a processor configured to control the receiver to receive the signal transmitted from the relay node at a timing delayed by a propagation delay time value of the signal due to a distance between the relay node and the eNode B from a transmitted timing point of the signal in the UL subframe of the index N or the index N+1 of the eNode B.

Preferably, the processor controls the receiver to receive the signal transmitted from the relay by any one reception mode of first reception mode of receiving the signal via sixth to fourteenth symbols of the UL backhaul subframe of the index N of the eNode B, a second reception mode of receiving the signal via a second slot of the UL backhaul subframe of the index N of the eNode B, a third reception mode of receiving the signal via first to eighth symbols of a UL backhaul subframe of the index N+1 of the eNode B, and a fourth reception mode of receiving the signal via a first slot of a UL subframe of the index N+1 of the eNode B according to the delayed timing.

To further achieve these and other advantages and in accordance with the purpose of the present invention, a relay node for transmitting a UL backhaul signal to an eNode B in a wireless communication system, according to a further embodiment of the present invention, the relay node includes a transmitter configured to transmit the UL backhaul signal to the eNode B via a UL backhaul subframe of an index N of the relay node and a processor configured to control the transmitter to transmit the UL backhaul signal in the UL backhaul subframe of the index N via 9 symbols subsequent to a first guard period corresponding to a time necessary for the relay node to switch from a reception mode to a transmission mode, 8 symbols preceding a second guard period corresponding to a time necessary for a switching from the transmission mode to the reception mode, or 7 symbols located between idle intervals.

Preferably, the UL backhaul signal transmitted from the transmitter is received by the eNode B at a timing delayed by a propagation delay time value of the UL backhaul signal in accordance with a distance between the relay node and the eNode B.

Advantageous Effects

According to various embodiments of the present invention, a relay node is able to efficiently transmit a UL backhaul signal to an eNode B and the eNode B is able to efficiently receive the UL backhaul signal from the relay node.

According to various embodiments of the present invention, an eNode B and a relay node become aware of a UL backhaul subframe structure through signaling or the like, thereby performing a communication efficiently.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Moreover, a relay may be named one of a relay node (RN), a relay station (RS), a relay and the like.

In a mobile communication system, a user equipment is able to receive information in downlink and is able to transmit information in uplink as well. Information transmitted or received by the user equipment may include various kinds of data and control information's. In accordance with types and usages of the information's transmitted or received by the user equipment, various physical channels may exist.

Figure 1:
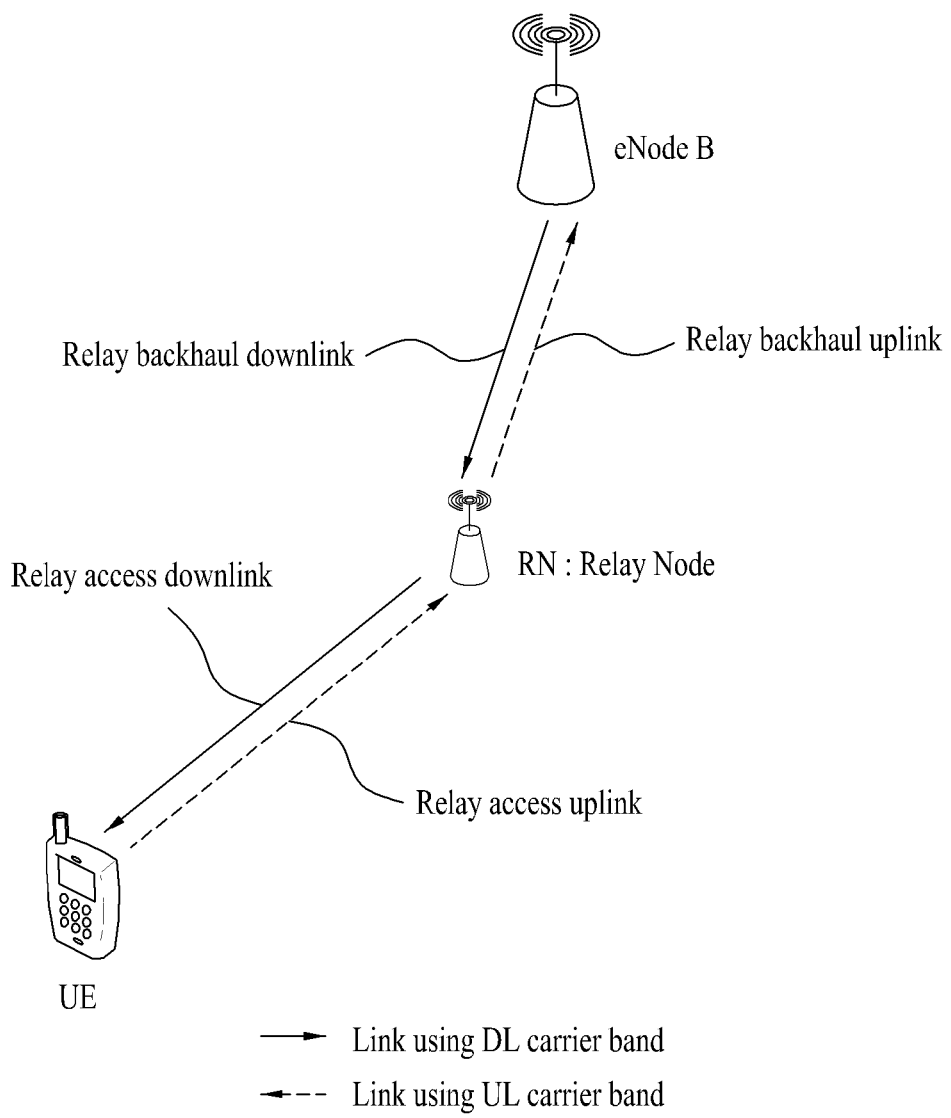
FIG. 1 is a diagram for configurations of a relay backhaul link and a relay access link in a wireless communication system.

FIG. 1 is a diagram for configurations of relay backhaul link and relay access link in a wireless communication system.

Referring to FIG. 1, as a relay node is introduced to play a role of forwarding a link between an eNode B and a user equipment, links of two types differing from each other in attribute are applied to a UL carrier frequency band and a DL carrier frequency band, respectively. A link part connected between an eNode B and a relay node is represented in a manner of being defined as a backhaul link. If transmission is performed via a backhaul link using a DL frequency band (in case of FDD (frequency division duplex)) or a resource of a DL subframe (in case of TDD (time division duplex)), it may be represented as a backhaul downlink. If transmission is performed via a backhaul link using a UL frequency band (in case of FDD) or a resource of a UL subframe (in case of TDD), it may be represented as a backhaul uplink.

On the other hand, a link part connected between a relay node and a series of user equipment is represented in a manner of being defined as a relay access link. If transmission is performed via a relay access link using a DL frequency band (in case of FDD) or a resource of a DL subframe (in case of TDD), it may be represented as an access downlink. If transmission is performed via a relay access link using a UL frequency band (in case of FDD) or a resource of a UL subframe (in case of TDD), it may be represented as an access uplink.

A relay node may receive information from an eNode B in relay backhaul downlink or transmit information to the eNode B in relay backhaul uplink. The relay node may transmit information to a user equipment in relay access downlink or receive information from the user equipment in relay access uplink.

A relay node may be able to perform such an initial cell search as a job of matching synchronization with an eNode B and the like. To this end, the relay node may receive a synchronization channel from the eNode B, match synchronization with the eNode B, and then acquire such information as cell ID and the like. Subsequently, the relay node may be able to acquire intra-cell broadcast information by receiving a physical broadcast channel from the eNode B. Meanwhile, in the step of the initial cell search, the relay node may check a channel status of a relay backhaul downlink by receiving a relay backhaul downlink reference signal. And, the relay node may be able to detailed system information by receiving R-PDCCH (Relay-Physical Downlink Control CHannel) and/or R-PDSCH (Relay-Physical Downlink Control CHannel).

Meanwhile, if an eNode B is initially accessed or a radio resource for signal transmission is absent, a relay node may perform a random access procedure. To this end, the relay node may transmit a preamble via a physical random access channel (PRACH) or the like and then receive a response message in response to the random access via R-PDCCH or a corresponding R-PDSCH. In doing so, the relay node may receive such information on subframe timing, transmission timing and the like as a timing advance value and the like from the eNode B via the RACH response.

Thereafter, in case of a contention based random access except a case of handover, it may be able to perform such a contention resolution procedure as a transmission of an additional physical random access channel, an R-PDCCH/R-PDSCH reception.

After completion of the above-described procedures, the relay node may perform such a general UL/DL signal transmission procedure as R-PDCCH/R-PDSCH and R-PUSCH/R-PUCCH (Relay-Physical Uplink Shared CHannel/Relay-Physical Uplink Control CHannel) transmission.

In this case, control information, which is transmitted to the eNode B in uplink by the relay node or received from the relay node by the eNode B, may include one of ACK/NACK signal, CQI (Channel Quality Indicator), PMI (Precoding Matrix Index), RI (Rank Indicator) and the like. In case of 3GPP LTE ($3^{rd}$ Generation Partnership Project Long Term Evolution) LTE-A system, a relay node may be able to transmit such control information as CQI, PMI, RI and the like on R-PUSCH/R-PUCCH.

Figure 2:
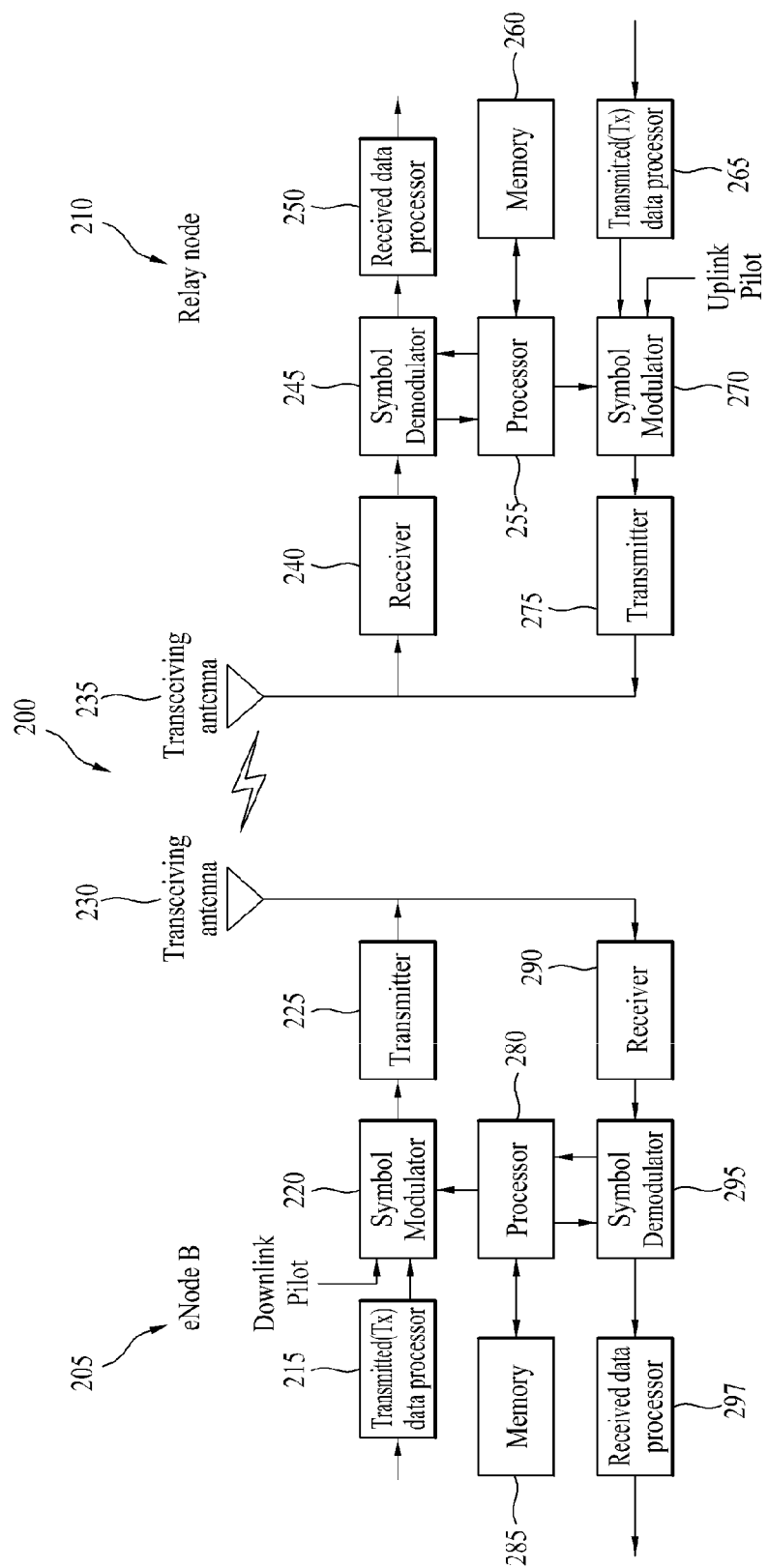
FIG. 2 is a block diagram for configurations of an eNode B 205 and a relay node 210 in a wireless communication system 200 according to the present invention.

FIG. 2 is a block diagram for configurations of an eNode B 205 and a relay node 210 in a wireless communication system 200.

Although one eNode B 205 and one relay node 210 are shown in the drawing to schematically represent a wireless communication system 200, the wireless communication system 200 may include at least one eNode B and/or at least one relay node.

Referring to FIG. 2, an eNode B 205 may include a transmitted (Tx) data processor 215, a symbol modulator 220, a transmitter 225, a transceiving antenna 230, a processor 280, a memory 285, a receiver 290, a symbol demodulator 295 and a received data processor 297. And, a relay node 210 may include a transmitted (Tx) data processor 265, a symbol modulator 270, a transmitter 275, a transceiving antenna 235, a processor 255, a memory 260, a receiver 240, a symbol demodulator 255 and a received data processor 250. Although the eNode B/relay node 205/210 includes one antenna 230/235 in the drawing, each of the eNode B 205 and the relay node 210 includes a plurality of antennas. Therefore, each of the eNode B 205 and the relay node 210 of the present invention supports an MIMO (multiple input multiple output) system. And, the eNode B 205 according to the present invention may support both SU-MIMO (single user-MIMO) and MU-MIMO (multi user-MIMO) systems.

In downlink, the transmitted data processor 215 receives traffic data, codes the received traffic data by formatting the received traffic data, interleaves the coded traffic data, modulates (or symbol maps) the interleaved data, and then provides modulated symbols (data symbols). The symbol modulator 220 provides a stream of symbols by receiving and processing the data symbols and pilot symbols.

The symbol modulator 220 multiplexes the data and pilot symbols together and then transmits the multiplexed symbols to the transmitter 225. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 225 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the relay node via the antenna 230.

In the configuration of the relay node 210, the antenna 235 receives the downlink signal from the eNode B and then provides the received signal to the receiver 240. The receiver 240 adjusts the received signal (e.g., filtering, amplification and frequency downconverting), digitizes the adjusted signal, and then obtains samples. The symbol demodulator 245 demodulates the received pilot symbols and then provides them to the processor 255 for channel estimation.

The symbol demodulator 245 receives a frequency response estimated value for downlink from the processor 255, performs data demodulation on the received data symbols, obtains data symbol estimated values (i.e., estimated values of the transmitted data symbols), and then provides the data symbols estimated values to the received (Rx) data processor 250. The received data processor 250 reconstructs the transmitted traffic data by performing demodulation (i.e., symbol demapping, deinterleaving and decoding) on the data symbol estimated values.

The processing by the symbol demodulator 245 and the processing by the received data processor 250 are complementary to the processing by the symbol modulator 220 and the processing by the transmitted data processor 215 in the eNode B 205, respectively.

In the relay node 210 in uplink, the transmitted data processor 265 processes the traffic data and then provides data symbols. The symbol modulator 270 receives the data symbols, multiplexes the received data symbols, performs modulation on the multiplexed symbols, and then provides a stream of the symbols to the transmitter 275. The transmitter 275 receives the stream of the symbols, processes the received stream, and generates an uplink signal. This uplink signal is then transmitted to the eNode B 205 via the antenna 135.

In the eNode B 205, the uplink signal is received from the relay node 210 via the antenna 230. The receiver 290 processes the received uplink signal and then obtains samples. Subsequently, the symbol demodulator 295 processes the samples and then provides pilot symbols received in uplink and a data symbol estimated value. The received data processor 297 processes the data symbol estimated value and then reconstructs the traffic data transmitted from the relay node 210.

The processor 255/280 of the relay node/eNode B 210/205 directs operations (e.g., control, adjustment, management, etc.) of the relay node/eNode B 210/205. The processor 255/280 may be connected to the memory unit 260/285 configured to store program codes and data. The memory 260/285 is connected to the processor 255/280 to store operating systems, applications and general files.

The processor 255/280 may be called one of a controller, a microcontroller, a microprocessor, a microcomputer and the like. And, the processor 255/280 may be implemented using hardware, firmware, software and/or any combinations thereof. In the implementation by hardware, the processor 255/280 may be provided with one of ASICs (application specific integrated circuits), DSPs (digital signal processors), DSPDs (digital signal processing devices), PLDs (programmable logic devices), FPGAs (field programmable gate arrays), and the like.

In case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 255/280 or saved in the memory 260/285 to be driven by the processor 255/280.

Layers of a radio protocol between a relay node and an eNode B may be classified into $1^{st}$ layer L1, $2^{nd}$ layer L2 and $3^{rd}$ layer L3 based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resourced between UE and network. A relay node and an eNode B may be able to exchange RRC messages with each other via radio communication layer and RRC layers.

Figure 3:
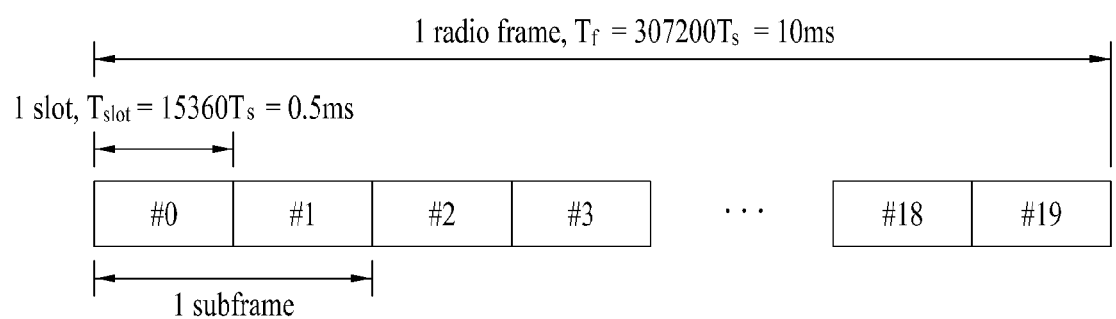
FIG. 3 is a diagram for one example of a structure of a radio frame used in 3GPP LTE system as one example of a mobile communication system.

FIG. 3 is a diagram for one example of a structure of a radio frame used in 3GPP LTE system as one example of a mobile communication system.

Referring to FIG. 3, one radio frame has a length of 10 ms ($327,200 \cdot T_s$) and is constructed with 10 subframes in equal size. Each of the subframes has a length of 1 ms and is constructed with two slots. Each of the slots has a length of 0.5 ms ($15,360 \cdot T_s$). In this case, $T_s$ indicates a sampling time and is expressed as $T_s=1/(15 \text{ kHz} \times 2,048)=3.2552 \times 10^{-8}$ (about 33 ns). The slot includes a plurality of OFDM symbols or SC-FDMA symbols in a time domain and also includes a plurality of resource blocks (RBs) in a frequency domain.

In the LTE system, one resource block (RB) includes '12 subcarriers×7 or 6 OFDM or SC-FDMA (single carrier-frequency division multiple access) symbols'. A transmission time interval (hereinafter abbreviated TTI), which is a unit time for transmitting data, can be determined by at least one subframe unit. The above-described structure of the radio frame is just exemplary. And, the number of subframes included in a radio frame, the number of slots included in a subframe and/or the number of OFDM or SC-FDMA symbols included in a slot may be modified in various ways.

Figure 4:
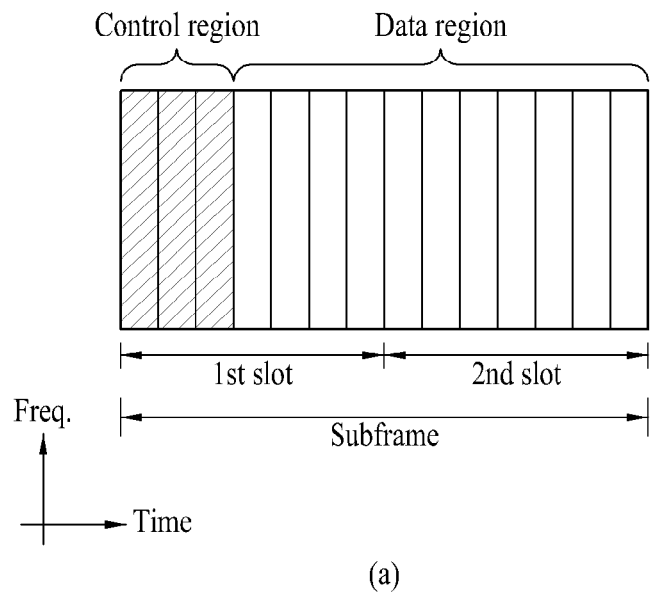
FIG. 4 is a diagram for structures of downlink and uplink subframe in 3GPP LTE system as one example of a mobile communication system.
Figure 4:
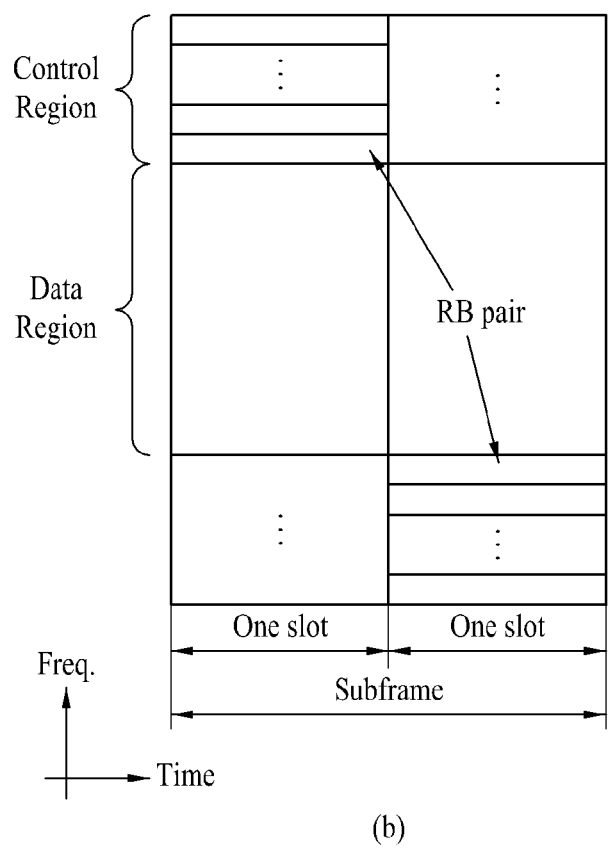

FIG. 4 is a diagram for structures of downlink and uplink subframe in 3GPP LTE system as one example of a mobile communication system.

Referring to FIG. 4 (a), one downlink (hereinafter abbreviated DL) subframe includes 2 slots in a time domain. Maximum 3 fore OFDM symbols of the first slot within the DL subframe correspond to a control region for allocating control channels thereto and the rest of the OFDM symbols correspond to a data zone for allocating PDSCH (physical downlink shared channel) thereto.

DL (downlink) control channels used in 3GPP LTE system or the like include PCFICH (physical control format indicator channel), PDCCH (physical downlink control channel), PHICH (physical hybrid-ARQ indicator channel), etc. The PCFICH carried on a first OFDM symbol carries the information on the number of OFDM symbols (i.e., a size of a control region) used for the transmission of control channels within a subframe. The control information carried on the PDCCH is called downlink control information (hereinafter abbreviated DCI). The DCI indicates a UL resource allocation information, a DL resource allocation information, a UL transmission power control command for random user equipment groups and the like. The PHICH carries ACK/NACK (acknowledgement/not-acknowledgement) signal for UL HARQ (hybrid automatic repeat request). In particular, the ACK/NACK signal for UL data transmitted by a user equipment is carried on PHICH.

In the following description, PDCCH of DL physical channel is explained.

First of all, an eNode B is able to transmit resource allocation and transmission format (this is so-called DL grant) of PDSCH, resource allocation information (this is so-called UL grant) of a physical UL shared channel, an aggregation of transmission power control commands for a random user equipment and individual user equipment in a group, activation of VoIP (voice over internet protocol) and the like via PDCCH. A plurality of PDCCHs may be transmitted within a control region and a user equipment may be able to monitor a plurality of the PDCCHs. The PDCCH is constructed with aggregation of one or several contiguous CCEs (control channel elements). The PDCCH constructed with the aggregation of one or several CCEs may be transmitted via the control region after completion of subblock interleaving. The CCE is a logical allocation unit used to provide the PDCCH with a coding rate in accordance with a status of a radio channel. The CCE corresponds to a plurality of resource element groups. The format of the PDCCH and the bit number of available PDCCH are determined in accordance with the correlation between the number of CCEs and the coding rate provided by the CCEs.

The control information carried on the PDCCH may be called DL control information (hereinafter abbreviated DCI). Table 1 shows the DCI according to DCI format.

TABLE 1

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 indicates UL resource allocation information, DCI formats 1~2 indicate DL resource allocation information, and DCI format 3 or 3A indicates a transmission power control (hereinafter abbreviated TPC) command for random UE groups.

A scheme for an eNode B to map a resource for PDCCH transmission in LTE system is schematically described as follows.

Generally, an eNode B is able to transmit scheduling allocation information and other control information's via PDCCH. A physical control channel can be transmitted as one aggregation or a plurality of contiguous control channel elements (CCEs). In this case, one control channel element (hereinafter abbreviated CCE) includes 9 resource element groups (REGs). The number of REGs failing to be allocated to PCFICH (physical control format indicator channel) or PHICH (physical hybrid automatic repeat request indicator channel) is $N_{REG}$. The number of CCEs available for a system ranges 0 to '$N_{CCE}-1$'. The PDCCH supports such a multiple format as shown in Table 2. One PDCCH including n contiguous CCEs starts with a CCE that executes 'i mod n=0', where 'i' is a CCE number. Multiple PDCCHs may be transmitted in one subframe.

DCI format 0 indicates UL resource allocation information, DCI formats 1~2 indicate DL resource allocation information, and DCI format 3 or 3A indicates a transmission power control (hereinafter abbreviated TPC) command for random UE groups.

A scheme for an eNode B to map a resource for PDCCH transmission in LTE system is schematically described as follows.

Generally, an eNode B may be able to transmit scheduling allocation information and other control information's via PDCCH. A physical control channel may be transmitted as one aggregation or a plurality of contiguous control channel elements (CCEs). In this case, one control channel element (hereinafter abbreviated CCE) includes 9 resource element groups (REGs). The number of REGs failing to be allocated to PCFICH (physical control format indicator channel) or PHICH (physical hybrid automatic repeat request indicator channel) is $N_{REG}$. The number of CCEs available for a system ranges 0 to '$N_{CCE}-1$', where $N_{CCE}=\lfloor N_{REG}/9 \rfloor$. The PDCCH supports such a multiple format as shown in Table 2. One PDCCH including n contiguous CCEs starts with a CCE that executes 'i mod n=0', where 'i' is a CCE number. Multiple PDCCHs may be transmitted in one subframe.

TABLE 2

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 2, an eNode B is able to determine a PDCCH format in accordance with how many regions will receive control information and the like. And, a user equipment is able to reduce overhead by reading the control information and the like by CCE unit. Likewise, a relay node may be able to read control information and the like by R-CCE unit. In LTE-A system, it may be able to map a resource element (RE) by R-CCE (relay-control channel element) unit in order to transmit R-PDCCH for a random relay node.

Referring to FIG. 4 (b), a UL subframe can be divided into a control region and a data region in a frequency domain. The control region is allocated to a physical UL control channel (PUCCH) carrying UL control information. And, the data region is allocated to a physical UL shared channel (PUSCH) for carrying user data. In order to maintain the single charier property, one user equipment does not transmit PUCCH and PUSCH simultaneously. PUCCH for one user equipment is allocated as an RB pair in one subframe. RBs belonging to the RB pair occupy different subcarriers in two slots, respectively. And, frequency hopping is performed on the RB pair allocated to the PUCCH on a slot boundary.

Figure 5:
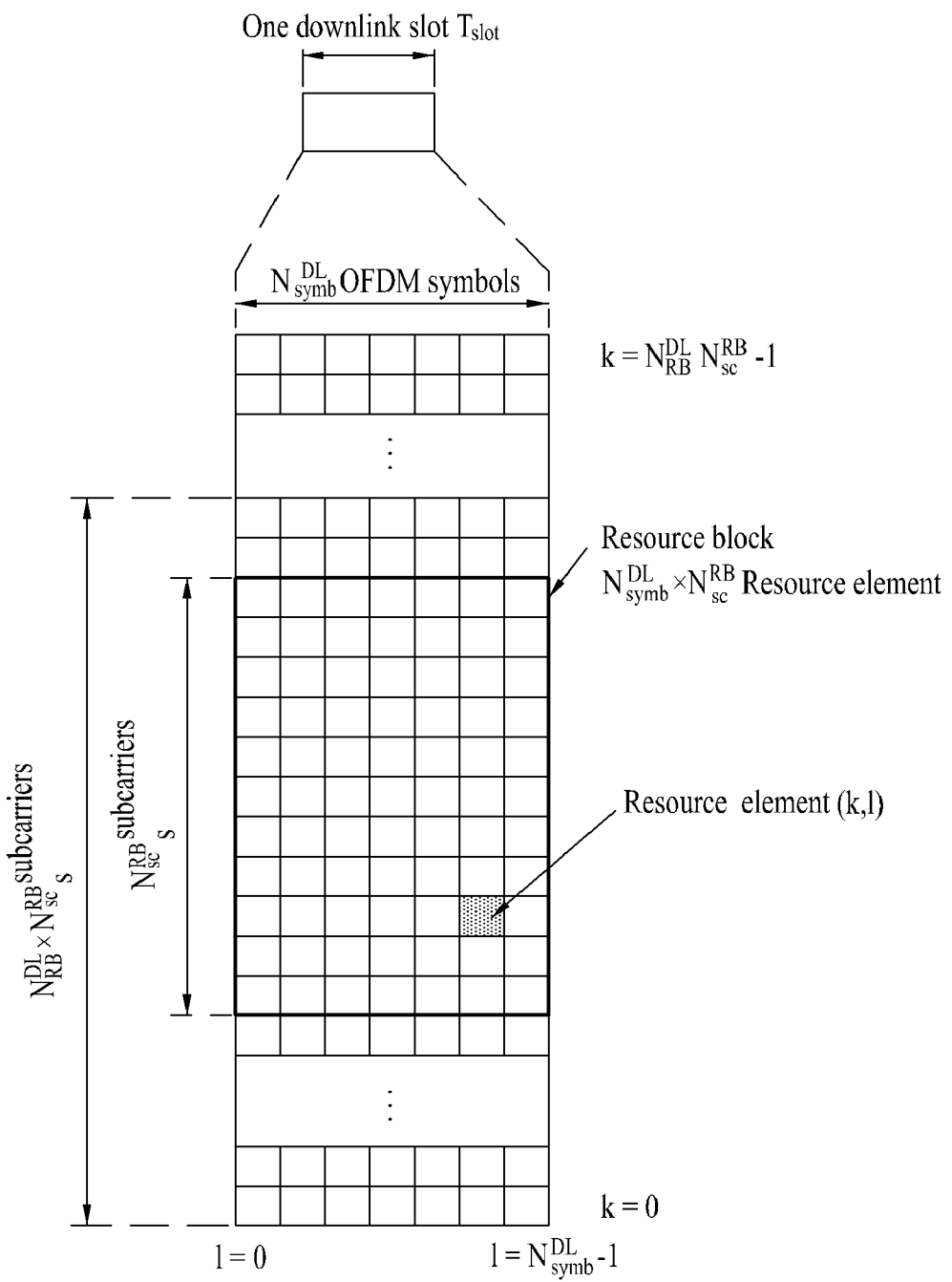
FIG. 5 is a diagram of a time-frequency resource grid structure used by the present invention.

FIG. 5 is a diagram of a downlink time-frequency resource grid structure used by the present invention.

A DL signal transmitted in each slot uses a resource grid structure constructed with $N_{RB}^{DL} \times N_{SC}^{RB}$ subcarriers and $N_{symb}^{DL}$ OFDM (Orthogonal Frequency Division Multiplexing) symbols. In this case, '$N_{RB}^{DL}$' indicates the number of resource blocks (RBs) in DL, '$N_{SC}^{RB}$' indicates the number of subcarriers constructing one RB, and '$N_{symb}^{DL}$' indicates the number of OFDM symbols in one DL slot. A size of '$N_{RB}^{DL}$' varies in accordance with a DL transmission bandwidth configured within a cell and should meet '$N_{RB}^{min,DL} \leq N_{RB}^{DL} \leq N_{RB}^{max,DL}$'. In this case, '$N_{RB}^{min,DL}$' is a smallest DL bandwidth supported by a wireless communication system and '$N_{RB}^{max,DL}$' is a greatest DL bandwidth supported by the wireless communication system. It may become '$N_{RB}^{min,DL}=6$' and '$N_{RB}^{max,DL}=110$', by which the present example is non-limited. The number of the OFDM symbols included in one slot can vary in accordance with a length of a CP (cyclic prefix) and an interval of subcarrier. In cases of multi-antennal transmission, one resource grid can be defined for each antenna port.

Each element within the resource grid for each antenna port is called a resource element (hereinafter abbreviated RE) and is uniquely identified by an index pair (k, l) within a slot. In this case, 'k' is an index in a frequency domain and 'l' is an index in a time domain. The 'k' has a value selected from '$0, \ldots, N_{RB}^{DL}N_{SC}^{RB}-1$' and the 'l' has a value selected from '$0, \ldots, N_{symb}^{DL}-1$'.

The resource block shown in FIG. 5 is used to describe the mapping relation between a prescribed physical channel and resource elements. Resource blocks can be classified into physical resource blocks (PRBs) and virtual resource blocks (VRBs). One PRB can be defined by $N_{symb}^{DL}$ contiguous OFDM symbols in time domain and $N_{SC}^{RB}$ contiguous subcarriers in frequency domain. In this case, '$N_{symb}^{DL}$' and '$N_{SC}^{RB}$' can be given as shown in Table 3. Hence, one PRB is constructed with '$N_{symb}^{DL} \times N_{SC}^{RB}$' resource elements. One PRB corresponds to one slot in time domain and also corresponds to 180 kHz in frequency domain, by which the present example is non-limited.

TABLE 3

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

PRB has a value ranging 0 to '$N_{RB}^{DL}-1$' in frequency domain. The relation between the PRB number ($n_{PRB}$) in frequency domain and the resource element (k, l) in one slot satisfies $$n_{PRB} = \left\lfloor \frac{k}{N_{sc}^{RB}} \right\rfloor,$$

In this case, a size of the VRB is equal to that of PRB. The VRB can be defined in a manner of being categorized into a localized VRB (hereinafter abbreviated LVRB) and a distributed VRB (hereinafter abbreviated DVRB). For the VRB of each type, a single VRB number '$n_{VRB}$' is allocated to a pair of VRBs in two slots within one subframe.

The VRB may have a size equal to that of the PRB. VRBs of two types may be defined as follows. First of all, the first type is the localized VRB (LVRB). And, the second type is the distributed VRB (DVRB). For the VRB of each of the types, a pair of VRBs are allocated across two slots of one subframe with a single VRB index (hereinafter named a VRB number). In particular, one index selected from the group consisting of 0 to '$N_{RB}^{DL}-1$' is allocated to $N_{RB}^{DL}$ VRBs belonging to a first one of the two slots constructing one subframe. And, one index selected from the group consisting of 0 to '$N_{RB}^{DL}-1$' is allocated to $N_{RB}^{DL}$ VRBs belonging to a second one of the two slots constructing one subframe as well.

As mentioned in the foregoing description with reference to FIGS. 3 to 5, the radio frame structure, the DL and UL subframes, the downlink time-frequency resource grid structure and the like may be applicable between an eNode B and a relay node.

R-PDCCH (relay-physical downlink control channel) used by the present invention may be used to mean a backhaul physical downlink control channel for a relay transmission from an eNode B to a relay node. And, R-PUCCH (relay-physical uplink control channel) used by the present invention may be used to mean a backhaul physical uplink control channel for a relay transmission to an eNode B from a relay node. R-PDSCH (relay-physical downlink shared channel) may be used to mean a backhaul downlink physical data/shared channel for a relay transmission. And, R-PUSCH (relay-physical uplink shared channel) may be used to mean a backhaul uplink physical data/shared channel for a relay transmission.

Moreover, a relay node used by the present invention is assumed as Half-Duplex relay node incapable of simultaneously interactive transmission/reception on the same band. Yet, the relay node used by the present invention may be non-limited by the Half-Duplex relay node.

Figure 6:
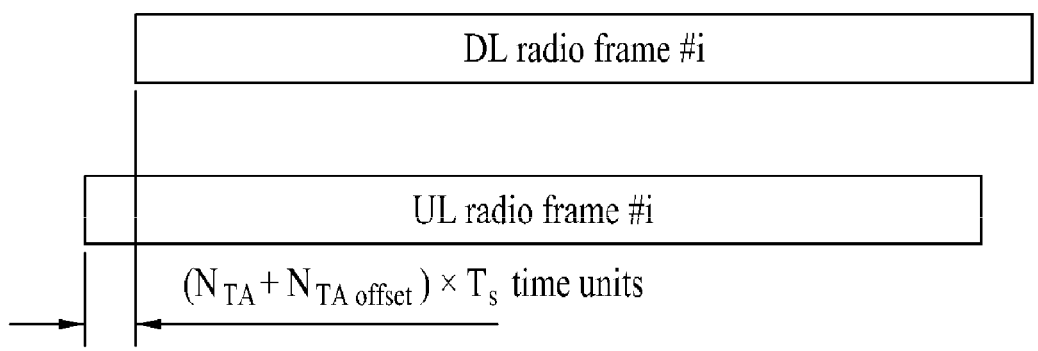
FIG. 6 is a diagram for one example of UL-DL frame timing relation.

FIG. 6 is a diagram for one example of UL-DL frame timing relation.

Referring to FIG. 6, a timing for a user equipment to transmit a UL radio frame of index i may run '$(N_{TA}+N_{TAoffset}) \times T_s$' ahead of a transmission timing of a DL radio frame of index i corresponding to the UL radio frame of index i. In particular, a start point of the UL radio frame i for receiving a UL signal from the user equipment may run '$(N_{TA}+N_{TAoffset}) \times T_s$' ahead of a start point of the DL radio frame i for performing a DL transmission to the user equipment. In this specification, $N_{TA}$ indicates a timing offset between a UL radio frame and a DL radio frame and is represented as Ts unit. $N_{TAoffset}$ indicates a fixed timing advance offset and is represented as Ts unit. In this case, Ts is a basic time unit. Moreover, it may be '$0 \leq N_{TA} \leq 20512$', '$N_{TAoffset}=0$' for a frame structure type 1, or '$N_{TAoffset}=624$' for a frame structure type 2.

As mentioned in the above description, in consideration of a propagation delay due to a transmission by a user equipment or a relay node, it may be able to set a UL reception timing of an eNode B to run ahead of a DL transmission timing.

In the following description, in consideration of a propagation delay of a signal in accordance with a distance between an eNode B and a relay node, a method of determining a UL subframe timing in a relay node and a corresponding symbol structure of a UL backhaul subframe are proposed.

First of all, a DL subframe timing in a relay node is described as follows. A boundary of a DL subframe in a relay node may be represented as one of two types shown in FIG. 7 and FIG. 8 in accordance with a distance between an eNode B and the relay node and a guard period (hereinafter abbreviated GP) or a guard time (hereinafter abbreviated GT) necessary for RF switching between transmission and reception in the relay node.

Figure 7:
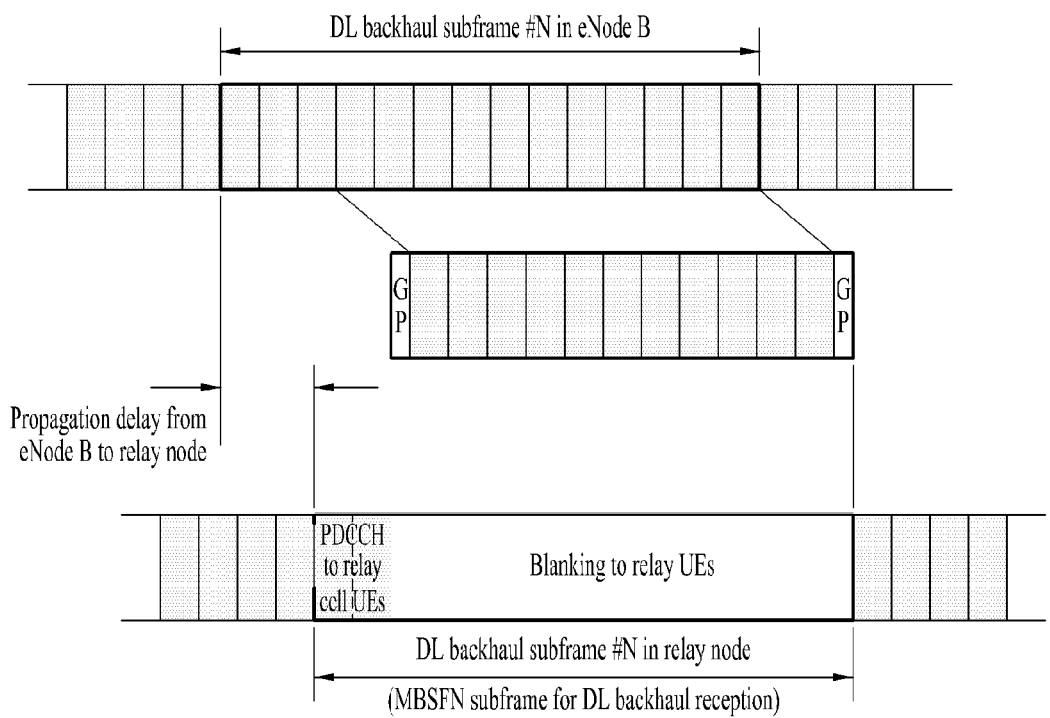
FIG. 7 and FIG. 8 are diagrams for a relation between DL backhaul subframe timing of an eNode B and DL backhaul subframe timing of a relay node, respectively.
Figure 8:
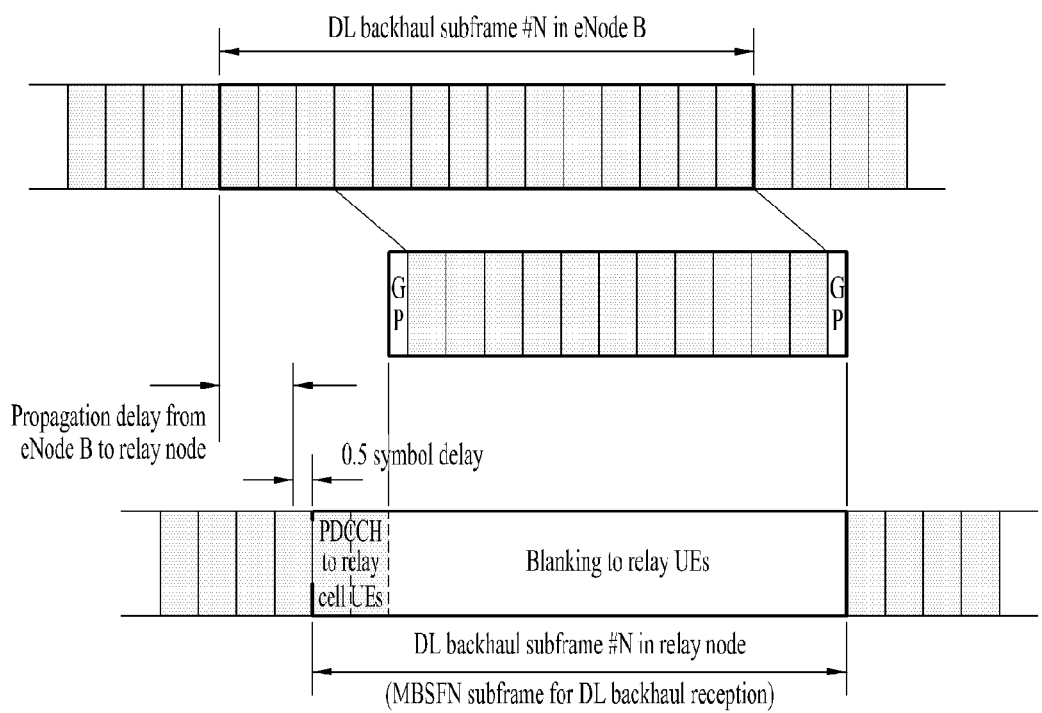

FIG. 7 and FIG. 8 are diagrams for a relation between DL backhaul subframe timing of an eNode B and DL backhaul subframe timing of a relay node, respectively.

Referring to FIG. 7, in case that an eNode B transmits a DL backhaul subframe of an index N to a relay node, a propagation delay of a signal may be generated from a distance between the eNode B and the relay node. Hence, a start point of a DL backhaul subframe of an index N of the relay node may be configured to have a timing delayed by a propagation delay of a signal behind a start point of the DL backhaul subframe of the index N of the eNode B. In particular, the DL backhaul subframe timing of the relay node may be set to be matched with a DL backhaul subframe received timing point of the eNode B.

Referring to FIG. 8, unlike FIG. 7, a DL backhaul subframe timing of a relay node may be set to a timing further delayed by 0.5 symbol time (e.g., 0.5 OFDM symbol time) from a DL backhaul subframe received timing point of an eNode B.

Figure 9:
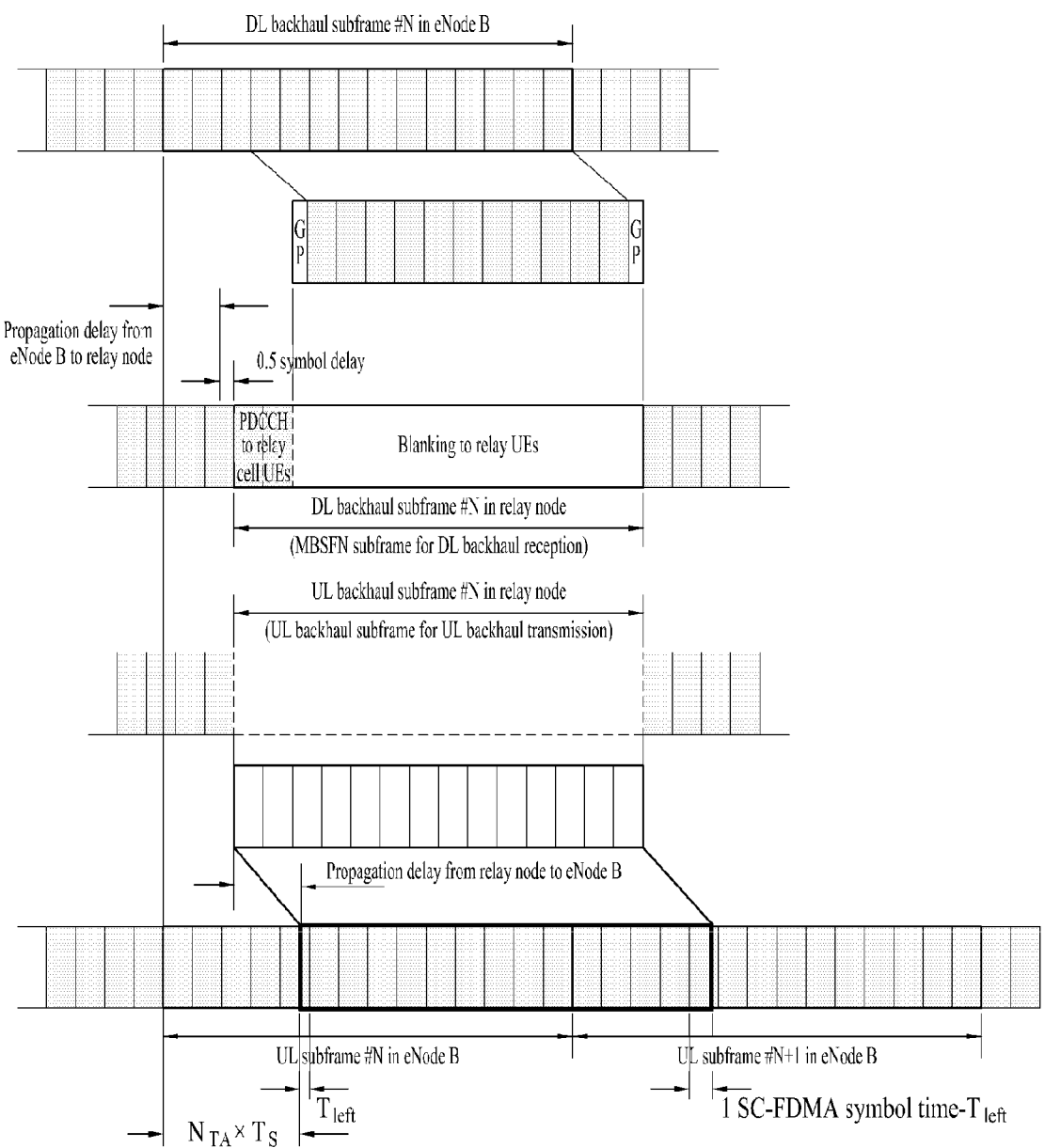
FIG. 9 is a diagram for one example of DL/UL backhaul subframe timing relation between an eNode B and a relay node.

FIG. 9 is a diagram for one example of DL/UL backhaul subframe timing relation between an eNode B and a relay node.

The subframe structure shown in FIG. 9 assumes that a DL backhaul subframe timing of a relay node shown in FIG. 8 is set to a timing further delayed by 0.5 symbol time (e.g., 0.5 OFDM symbol time) from a DL backhaul subframe received timing point of an eNode B. Hence, in case of FDD (frequency division duplex) system, referring to FIG. 9, a start timing of a DL backhaul subframe of an index N of a relay node may be set to be delayed to a timing point corresponding to a sum of a propagation delay time at a start timing point of a DL backhaul subframe of an index N of an eNode B and 0.5 symbol time.

Meanwhile, a timing of a UL backhaul subframe of an index N of a relay node may be set to coincide with a timing of a DL backhaul subframe of a corresponding relay node to enable a relay cell user equipment to avoid an impact in performing RACH (random access channel).

In FIG. 9, in an initial RACH procedure performed in the step that a relay node performs an initial access (or one of an initial setup, an initial deployment, etc.) to a donor eNode B, the relay node may be able to acquire a UL timing advance value through an RACH response. This UL timing advance value may be determined on the basis of a propagation delay value in accordance with a distance between the eNode B and the relay node. For instance, referring to FIG. 9, a UL timing advance value of the eNode B may be determined as '$N_{TA} \times Ts = 2 \times$propagation delay time+0.5 symbol time'. If a start timing of a DL backhaul subframe of an index N of a relay node is not delayed by 0.5 symbol, a UL timing advance value may be set to '$N_{TA} \times Ts = 2 \times$propagation delay time'.

In case that a start timing of a DL backhaul subframe of an index N of a relay node is time-aligned with a start timing of a UL backhaul subframe of an index N of the relay node, due to a propagation delay in accordance with a distance between an eNode B and the relay node, referring to FIG. 9, R-PUSCH or R-PUCCH signal transmitted by the relay node in a UL backhaul subframe of an index N is received by the eNode B by being delayed by a timing advance value. In particular, if the relay node transmits a UL backhaul signal to the eNode B via a UL backhaul subframe of an index N, as shown in FIG. 9, the eNode B receives the signal in UL subframes of indexes N and N+1.

Due to a propagation delay of a signal, as an eNode B receives a signal, which is transmitted in a UL backhaul subframe of an index N by a relay node, in UL subframes of indexes N and N+1, the relay node needs to be aware of information on an index of an available UL backhaul subframe and an index of an available UL backhaul symbol.

Symbols available for R-PUSCH or R-PUCCH transmission in a random UL backhaul subframe of a relay node may be determined based on a value $T_{left}$ shown in FIG. 9 and an RF transmission/reception switching time necessary for the relay node. Although the following description is based on the assumption that a range of an RF transmission/reception switching time $T_{switch}$ meets '$0 < T_{switch} < 1$ symbol duration', a value $T_{switch}$ out of this range may be applied to a UL backhaul subframe timing.

In the following description, explained are symbols available for a relay node to use for R-PUSCH or R-PUCCH transmission in a UL backhaul subframe in accordance with a value $T_{left}$ and a range of a value $T_{switch}$ (i.e., RF transmission/reception switching time of a relay node).

<Case 1>Case of '$T_{left < Tswitch}$' and '(1 symbol duration−$T_{left}$)>$T_{switch}$'

In Case 1, in aspect of synchronization with a UL symbol timing of an eNode B, as observed in FIG. 9, a UL backhaul subframe of an index N of a relay node needs a guard period (GP or GT) corresponding to '$T_{left}+1$ symbol duration' in front and a guard period (GP or GT) corresponding to '1 symbol duration−$T_{left}$' in rear. Hence, the relay node may be able to perform a backhaul transmission using 12 symbols in the UL backhaul subframe of the index N. For instance, when a specific relay node experiences such a propagation delay as shown in FIG. 9, if the relay node transmits a UL backhaul signal using all the 12 symbols, an eNode B may be able to receive the corresponding UL backhaul signal through 9 symbols of indexes 5 to 13 in a UL subframe of an index N and 3 symbols of indexes 0 to 2 in a contiguous UL subframe of an index N+1.

<Case 2>Case of '$T_{left < Tswitch}$' and '(1 symbol duration−$T_{left}$)<$T_{switch}$'

In Case 2, in aspect of synchronization with a UL symbol timing of an eNode B, as observed in FIG. 9, a UL backhaul subframe of an index N of a relay node needs a guard period (GP or GT) corresponding to '$T_{left}$' in front and a guard period (GP or GT) corresponding to '2 symbol durations−$T_{left}$' in rear. Hence, the relay node may be able to perform a backhaul transmission using 12 symbols in the UL backhaul subframe of the index N. For instance, when a specific relay node experiences such a propagation delay as shown in FIG. 9, if the relay node transmits a UL backhaul signal using all the 12 symbols, an eNode B may be able to receive the corresponding UL backhaul signal through 9 symbols of indexes 5 to 13 in a UL subframe of an index N and 3 symbols of indexes 0 to 2 in a contiguous UL subframe of an index N+1.

<Case 3>Case of '$T_{left < Tswitch}$' and '(1 symbol duration−$T_{left}$)>$T_{switch}$'

In Case 3, in aspect of synchronization with a UL symbol timing of an eNode B, as observed in FIG. 9, a UL backhaul subframe of an index N of a relay node needs a guard period (GP or GT) corresponding to '$T_{left}$' in front and a guard period (GP or GT) corresponding to '1 symbol duration−$T_{left}$' in rear. Hence, the relay node may be able to perform a backhaul transmission using 13 symbols in the UL backhaul subframe of the index N. For instance, when a specific relay node experiences such a propagation delay as shown in FIG. 9, if the relay node transmits a UL backhaul signal using all the 13 symbols, an eNode B may be able to receive the corresponding UL backhaul signal through 9 symbols of indexes 5 to 13 in a UL subframe of an index N and 4 symbols of indexes 0 to 3 in a contiguous UL subframe of an index N+1.

<Case 4>Case of '$T_{left} < T_{switch}$' and '(1 symbol duration−$T_{left}$)>$T_{switch}$'

In Case 4, in aspect of synchronization with a UL symbol timing of an eNode B, as observed in FIG. 9, a UL backhaul subframe of an index N of a relay node needs a guard period (GP or GT) corresponding to '$T_{left}+1$ symbol duration' in front and a guard period (GP or GT) corresponding to '2 symbol durations−$T_{left}$' in rear. Hence, the relay node may be able to perform a backhaul transmission using 11 symbols in the UL backhaul subframe of the index N. For instance, when a specific relay node experiences such a propagation delay as shown in FIG. 9, if the relay node transmits a UL backhaul signal using all the 11 symbols, an eNode B may be able to receive the corresponding UL backhaul signal through 8 symbols of indexes 6 to 13 in a UL subframe of an index N and 3 symbols of indexes 0 to 2 in a contiguous UL subframe of an index N+1.

As mentioned in the foregoing description with reference to FIG. 9, it may be able to determine symbols available in a UL backhaul subframe given in accordance with a value $T_{left}$ and an RF transmission/reception switching time in a relay node. Thus, even if a relay node is introduced into the same donor cell, a propagation delay time of a signal may vary in accordance with a corresponding geometry, whereby a UL backhaul subframe structure may be changed per relay node. In particular, in case that a UL subframe of an index N is set as a UL backhaul subframe in a relay node, signaling for indication of an available symbol index except GP may be necessary. A message indicating a corresponding available UL symbol index may be sent by a relay node to an eNode B by RRC (radio resource control) signaling in consideration of a timing advance value transmitted via an RACH response and $T_{left}$, $T_{switch}$ and the like, which are determined in accordance with the timing advance value, when the relay node performs an initial setup.

A method of signaling a corresponding available UL symbol index indication message may include a method of bitmap of total 28 symbol indexes (or total 24 symbol indexes in case of an extended CP application) of a UL subframe of an index N+1 contiguous with an eNode B UL subframe of an index N or a method of directly signaling a symbol index corresponding to a start point of available symbols and a symbol index corresponding to an end point of the available symbols. In this case, it may be able to configure a corresponding message with total 8 bits including 4 bits for a start symbol index transmission in a given UL subframe and 4 bits for a last symbol index transmission in a contiguous UL subframe.

For instance, in Case 3 shown in FIG. 9, the relay node may be able to directly signal a symbol index 5 corresponding to a start point of a UL subframe of an index N and a symbol index 3 corresponding to an end point of a UL subframe of an index N+1. Alternatively, the relay node only transmits quantized information on $T_{switch}$, which is its hardware switching time, and directly calculates a corresponding available symbol index in consideration of a timing advance value calculated by the eNode B through RACH.

<Embodiment of UL Backhaul Subframe Structure Based on Available Symbol Index>

In the following description, examples of a UL backhaul subframe structure possible on the basis of available UL backhaul symbol index indication are explained.

Figure 10:
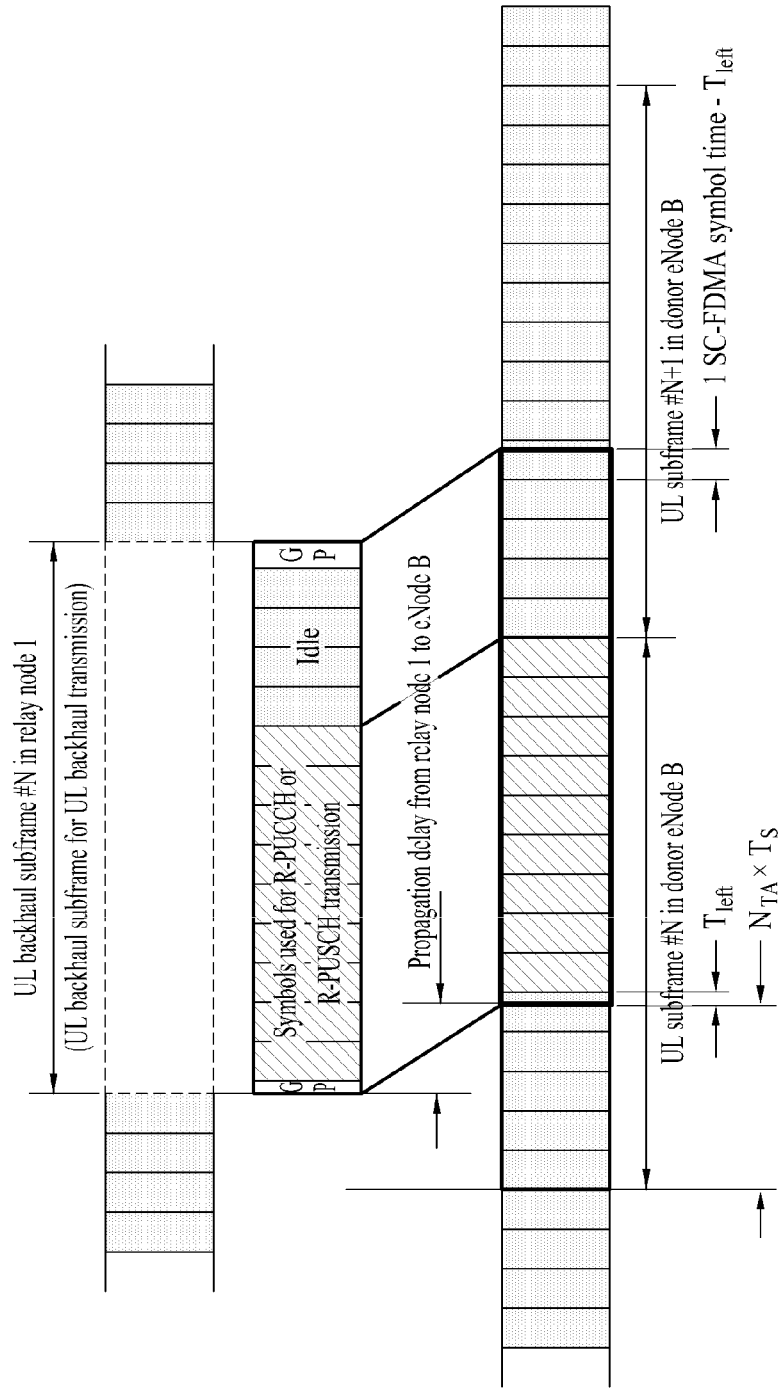
FIG. 10 and FIG. 11 are diagrams for examples of a structure of a UL backhaul subframe possible on the basis of an available UL backhaul symbol index indication, respectively.
Figure 11:
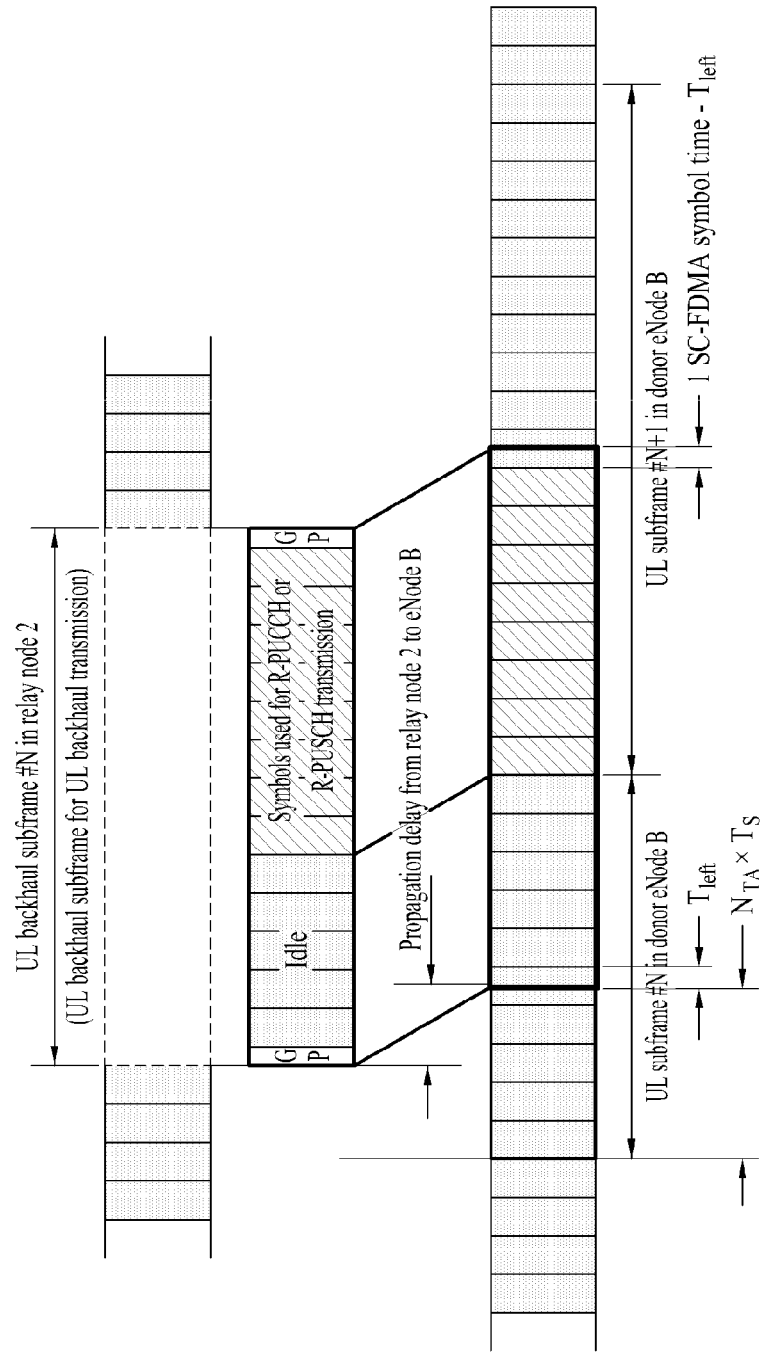

FIG. 10 and FIG. 11 are diagrams for examples of a structure of a UL backhaul subframe possible on the basis of an available UL backhaul symbol index indication, respectively.

As mentioned in the foregoing description with reference to FIG. 9, it may be able to determine an actual transmission structure of a UL subframe in a relay node based on a determined available UL backhaul symbol index. Referring to FIG. 10, a start timing of a UL backhaul subframe of a relay node may run a time corresponding to a signal propagation delay ahead of a UL subframe start timing of an eNode B.

For one example (Option 1) of an available UL backhaul subframe structure, it may be able to determine a UL backhaul subframe structure based on a boundary of a UL subframe of an eNode B. In particular, transmission is set to be performed through symbols received in a UL subframe of an index N of an eNode B among the given available symbols of a UL backhaul subframe of the same index N of a relay node.

Referring to FIG. 10, among available symbols transmittable via a UL backhaul subframe of an index N of a relay node 1, transmission may be set to be performed via 9 fore symbols (i.e., symbols in a slashed interval) received via a UL subframe of an index N of an eNode B.

Unlike the case shown in FIG. 10, referring to FIG. 11, a relay node 2 may be able to transmit a signal on 8 symbols (i.e., symbols in a slashed interval) received via a UL subframe of an index N+1 by an eNode B among available symbols of a UL backhaul subframe of an index N.

<Embodiment of UL Backhaul Subframe Structure Based on Available Slot>

Figure 12:
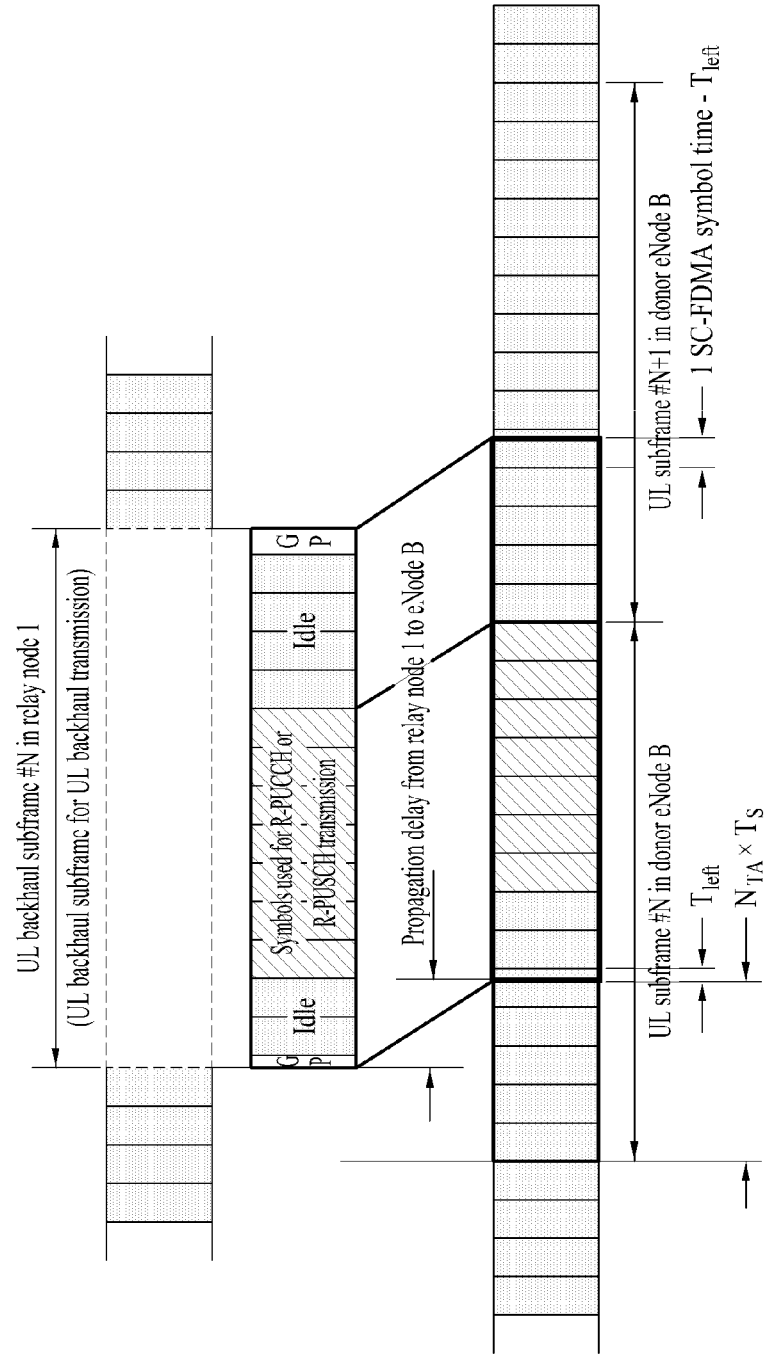
FIG. 12 and FIG. 13 are diagrams for examples of a structure of a UL backhaul subframe based on an available slot, respectively.
Figure 13:
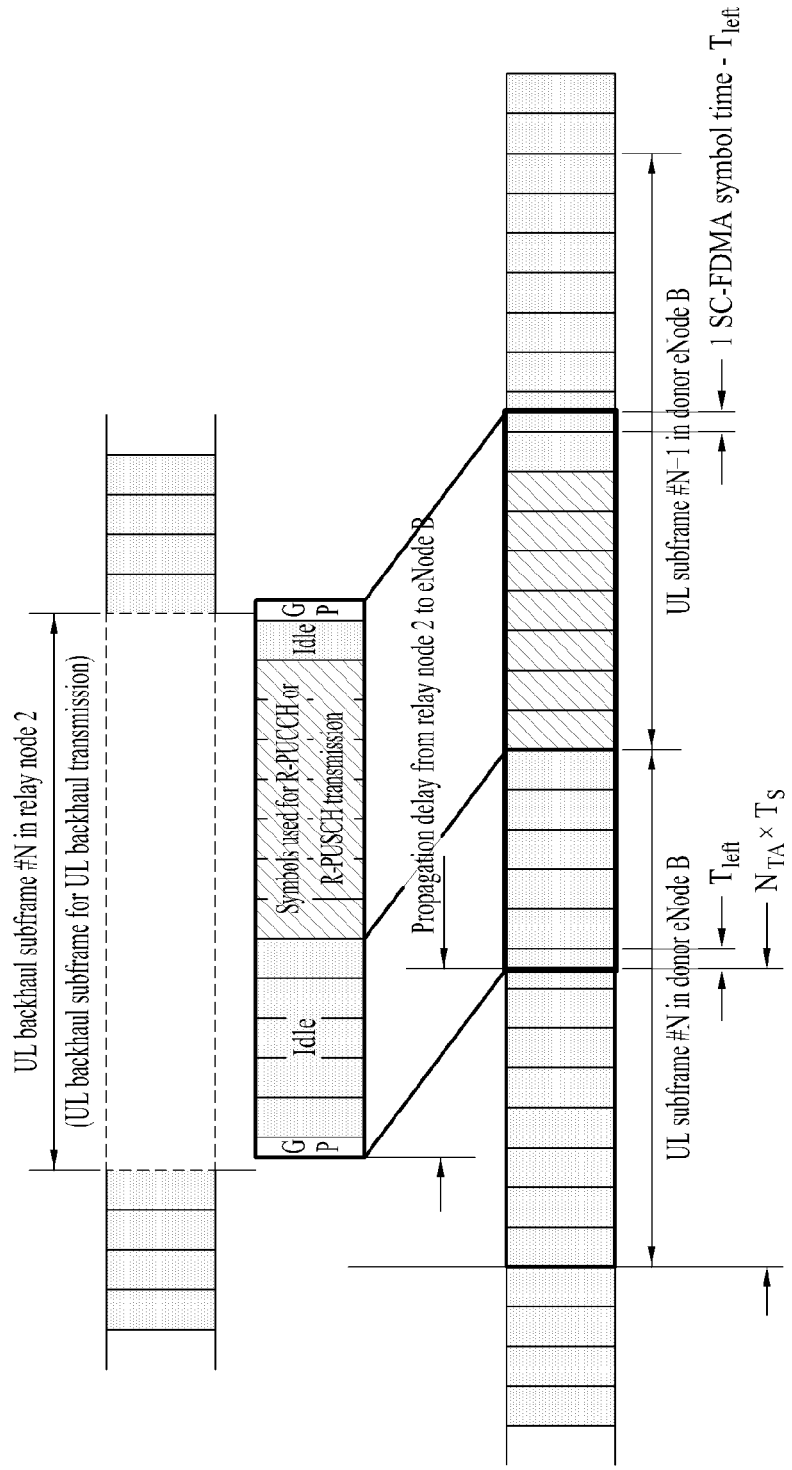

FIG. 12 and FIG. 13 are diagrams for examples of a structure of a UL backhaul subframe based on an available slot, respectively.

Referring to FIG. 12 and FIG. 13, in a UL backhaul subframe structure based on an available slot according to an embodiment, based on a slot unit, an eNode B may be able to receive a signal from a relay node via an available slot that is either a $2^{nd}$ slot of a UL subframe of an index N or a $1^{st}$ slot of a contiguous UL subframe of an index N+1.

In particular, referring to FIG. 12, a relay node 1 (RN1) is able to transmit a signal to an eNode B via $3^{rd}$ to $9^{th}$ symbols that are available symbols of a UL backhaul subframe of an index N. If so, due to the propagation delay of the signal in accordance with a distance (or geometry) between the relay node and the eNode B, the eNode B may be able to receive the signal, which is transmitted by the relay node 1 through the $3^{rd}$ to $9^{th}$ symbols of the UL backhaul subframe of the index N, via 7 symbols (i.e., symbols in the slashed region) corresponding to the $2^{nd}$ slot of the UL subframe of the index N. Thus, in the UL backhaul subframe structure, the eNode B may be able to receive the signal from the relay node 1 via the $2^{nd}$ slot of the UL backhaul subframe of the index N.

On the other hand, referring to FIG. 13, a relay node 2 (RN2) is able to transmit a signal to an eNode B via 7 slashed symbols including $6^{th}$ to $12^{th}$ symbols that are available symbols of a UL backhaul subframe of an index N. If so, due to the propagation delay of the signal, the eNode B may be able to receive the signal from the relay node 2 via the $1^{st}$ slot (i.e., 7 slashed symbols) of the UL subframe of the index N+1. Thus, in the UL backhaul subframe structure, the eNode B may be able to receive the signal from the relay node 2 via the $1^{st}$ slot of the UL backhaul subframe of the index N+1.

<Embodiment of UL Backhaul Subframe Structure Based on Available Symbol>

Figure 14:
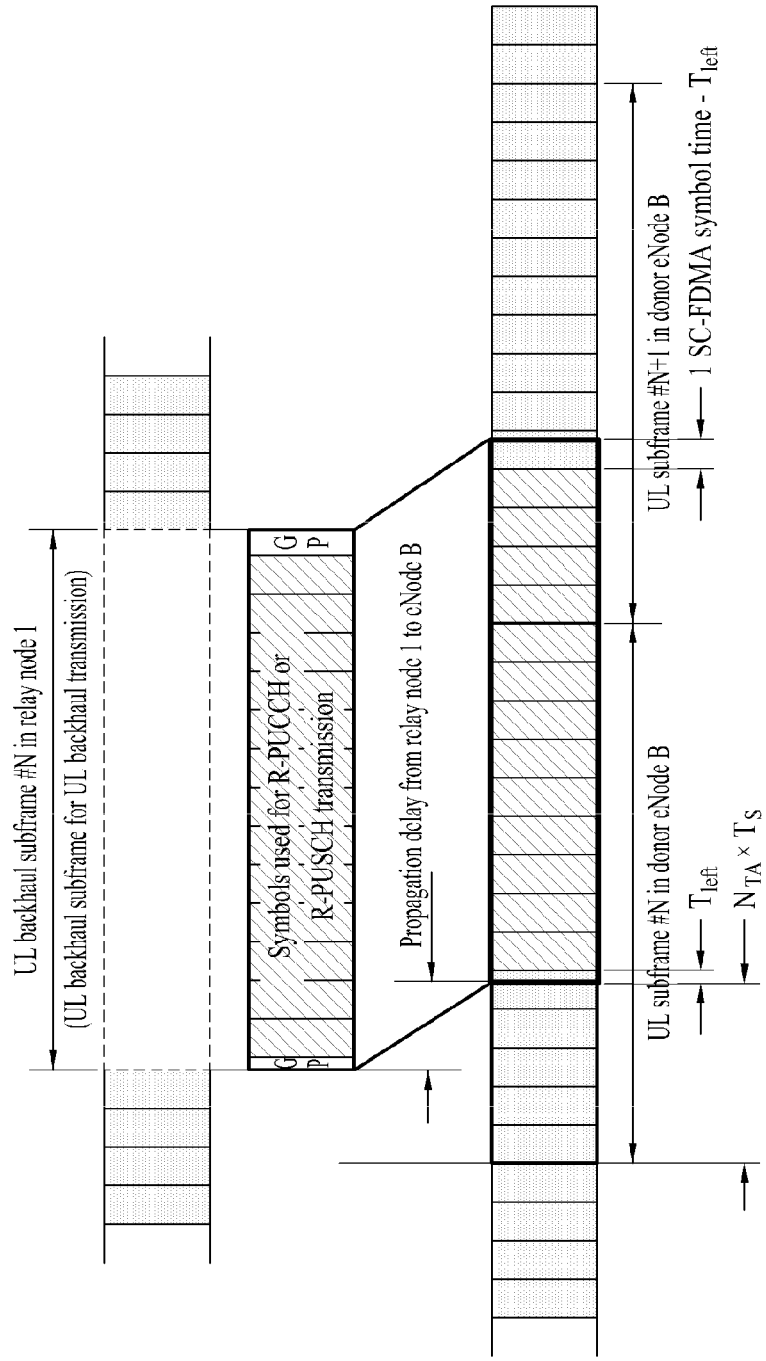
FIG. 14 is a diagram of a UL backhaul subframe structure based on available symbol according to one embodiment of the present invention.

FIG. 14 is a diagram of a UL backhaul subframe structure based on available symbol according to one embodiment of the present invention.

Referring to FIG. 14, in a UL backhaul subframe structure according to another embodiment, a relay node 1 may be able to transmit all available symbols (i.e., symbols corresponding to a slashed region) in a UL backhaul subframe of an index N.

The relay node 1 may be able to transmit a signal to an eNode B via 13 symbols except a GP interval in the UL backhaul subframe of the index N. If so, due to a propagation delay of the signal, the eNode B may be able to receive the signal from the relay node 1 through UL subframes of indexes N and N+1. In particular, the eNode B may be able to receive the signal, which is transmitted by the relay node 1 via the UL backhaul subframe of the index N, via $6^{th}$ to $14^{th}$ symbols of a UL subframe of the index N and $1^{st}$ to $4^{th}$ symbols of the UL subframe of the index N+1.

Regarding FIGS. 10 to 14, the UL backhaul subframe structure of the relay node 1 and the UL backhaul subframe structure of the relay node 2 are set different from each other. Thus, a UL backhaul subframe structure of each relay node can be configured differently. In the following description, a method of setting a structure of a UL backhaul subframe for each relay node and a method of signaling the corresponding UL backhaul subframe structure are explained.

First of all, a method of setting a structure of a UL backhaul subframe for each relay node is described. In a 1st case (Case 1), a UL a method of setting a structure of a UL backhaul subframe for each relay node structure may be set implicitly static. In particular, which one of the UL backhaul subframe structures described with reference to FIGS. 10 to 14 will be used can be implicitly set static.

In another case (Case 2), it may be able to semi-statically set a UL backhaul subframe structure. In particular, in the course of an initial setup step and update in a relay node, which one of the UL backhaul subframe structures described with reference to FIGS. 10 to 14 will be determined and applied as a UL backhaul subframe structure can be transmitted by an eNode B to each relay node through upper layer signaling.

In another case (Case 3), a UL backhaul subframe structure may be dynamically determined. When a specific relay node allocates a resource for R-PUSCH transmission via R-PDCCH, which one of the UL backhaul subframe structures described with reference to FIGS. 10 to 14 will be used for the transmission can be dynamically signaled to the specific relay node by the eNode B through UL grant each time. In doing so, the eNode B may be able to send the specific relay node a UL grant message containing an option field for selecting the frame structure examples shown in FIGS. 10 to 14.

The eNode B may be able to dynamically signal an operation selected in scheduling to a relay node (For example, a UL backhaul subframe structure, which will be used for the UL backhaul subframe structure examples shown in FIGS. 10 to 14, can be signaled each time a resource is allocated). Alternatively, the eNode B defines a bitmap field in accordance with the number of symbols available for the UL backhaul subframe structure shown in FIG. 10 or FIG. 11. The eNode B may be then able to transmit symbol allocation information to the relay node each time a resource is allocated.

<Method of Indicating a Symbol Index Used as a Data Demodulation Reference Signal (DM RS) in a Specific UL Backhaul Subframe Structure>

Meanwhile, an eNode B needs to indicate a symbol index, which is used for a data demodulation reference signal (DM RS) in a given UL backhaul subframe structure, to a relay node. In particular, in case that the relay node attempts to transmit R-PUSCH or R-PUCCH in the given UL backhaul subframe structure, the eNode B may indicate a symbol index to be used for DM RS among available symbols by bitmap indication or directly indicate a symbol index by signaling.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, an apparatus for transmitting and receiving a UL backhaul signal and method thereof are industrially applicable to such a communication system as 3GPP LTE, 3GPP LTE-A, IEEE 802 and the like.

What is claimed is:

1. A method of receiving an uplink (UL) signal from a relay node (RN) in a wireless communication system, the method performed by an eNode B and comprising:
receiving a signal transmitted from the relay node, the signal transmitted via an UL subframe of an index N of the relay node and received via an UL subframe of an index N+1 of the eNode B,
wherein the signal is received from the relay node at a time delayed from a transmission timing point of the signal by a propagation delay time of the signal due to a distance between the relay node and the eNode B,
wherein the signal is received from the relay node according to a first reception mode or a second reception mode such that the signal is received from the relay node via first to eighth symbols of the UL subframe of the index N+1 of the eNode B according to the first reception mode and the signal is received from the relay node via a first slot of the UL subframe of the index N+1 of the eNode B according to the second reception mode.

2. The method of claim 1, wherein whether the signal is received according to the first or second reception mode is predetermined.

3. The method of claim 1, further comprising receiving relay node information via higher layer signaling, the information indicating whether to receive the signal according to the first or second reception mode.

4. The method of claim 1, further comprising transmitting information indicating whether the signal is received according to the first or second reception mode.

5. The method of claim 1, wherein whether the signal is received according to the first or second reception mode is implicitly determined between the eNode B and the relay node.

6. An eNode B for receiving an uplink (UL) signal from a relay node in a wireless communication system, the eNode B comprising:
a receiver configured to receive signals; and
a processor configured to control the receiver to receive a signal transmitted from the relay node, the signal transmitted via an UL subframe of an index N of the relay node and received via an UL subframe of an index N+1 of the eNode B,
wherein the signal received from the relay node at a time delayed from a transmission timing point of the signal by a propagation delay time of the signal due to a distance between the relay node and the eNode B,
wherein the signal is received from the relay node according to a first reception mode or a second reception mode such that the signal is received from the relay node via first to eighth symbols of the UL subframe of the index N+1 of the eNode B according to the first reception mode and the signal is received from the relay node via a first slot of the UL subframe of the index N+1 of the eNode B according to the second reception mode.

7. The eNode B of claim 6, wherein whether the signal is received according to the first or second reception mode is predetermined.

8. The eNode B of claim 6, wherein the processor is further configured to control the receiver to receive relay node information via higher layer signaling, the information indicating whether to receive the signal according to the first or second reception mode.

9. The eNode B of claim 6, further comprising a transmitter, wherein the processor is further configured to control the transmitter to transmit information indicating whether the signal is received according to the first or second reception mode.

10. The eNode B of claim 6, wherein whether the signal is received according to the first or second reception mode is implicitly determined between the eNode B and the relay node.

* * * * *